Jan. 10, 1956   A. D. EMURIAN ET AL   2,730,623
RADIOSONDE TRANSMITTER HOUSING
Filed March 11, 1953

*INVENTOR.*
ALBERT D. EMURIAN
WILLIAM TODD
BY
*Harry M. Saragovitz*
*Attorney*

United States Patent Office 2,730,623
Patented Jan. 10, 1956

2,730,623

RADIOSONDE TRANSMITTER HOUSING

Albert D. Emurian, Merion, Pa., and William Todd, Interlaken, N. J., assignors to the United States of America as represented by the Secretary of the Army Application March 11, 1953, Serial No. 341,849

3 Claims. (Cl. 250—36)

(Granted under Title 35, U. S. Code (1952), sec. 266)

The invention described herein may be manufactured and used by or for the Government for governmental purposes, without the payment of any royalty thereon.

This invention relates to radiosonde systems and more particularly to a resonant cavity circuit especially adapted for use with radiosonde transmitters.

The use of tank circuits to control the frequency of ultra-high frequency systems is well known. Because of the compaartively light weight generally required in radiosonde systems, it is essential that the tank circuit be lightly constructed and yet provide a maximum R.-F. efficiency for a given power supply.

It is therefore an object of the present invention to provide an improved resonant tank structure for radiosonde transmitters which shall be efficient, easy to assemble, of comparatively light weight, of comparatively low cost, adapted for mass production, and have a high order of stability.

It is yet another object of the present invention to provide a tank structure for radiosonde transmitters having a relatively high Q and a relatively low impedance so that the major electrical components of the tank circuit may be assembled outside the tube.

It is a further object of the present invention to provide a tank structure wherein the effects of the tube lead-in wires on the resonant frequency are greatly minimized.

In accordance with the present invention, the resonant tank structure includes a pair of spaced mutually opposing metallic annular discs concentrically disposed relative to each other and a plurality of flat metallic strips interconnecting the outer peripheries of the annular discs. First and second metallic tubular members extend respectively from the inner peripheries of the annular discs and are so arranged that the free end of the second tubular member encompasses the free end of the first metallic member, said first and second tubular members being radially spaced from each other. A third metallic tubular member is radially spaced from and encompasses the first tubular member for substantially the entire length thereof and is adapted to be slideably positioned over said first tubular member. It is preferable that all the tubular members be axially aligned and means are provided for axially positioning said third tubular member within said second tubular member. A vacuum tube is mounted within the free end of the first tubular member and the plate of said vacuum tube is connected to the movable third tubular member by means of a spring contact member. A feed-in line has one end connected to one of the flat metallic strips and the other end thereof extends through the first tubular member and is supported in position by means of an insulated bushing.

For a better understanding of the invention, together with other and further objects thereof, reference is had to the following description taken in connection with the accompanying drawing in which.

Figure 1:
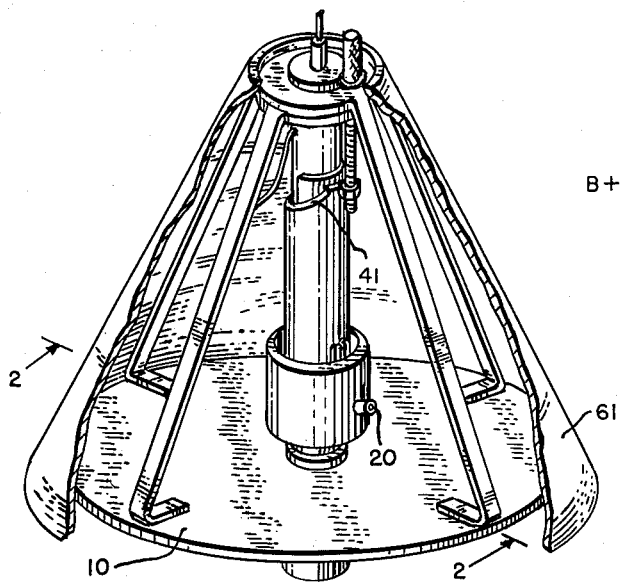
Fig. 1 is a front elevation of the tank structure partially cut away.
Figure 2:
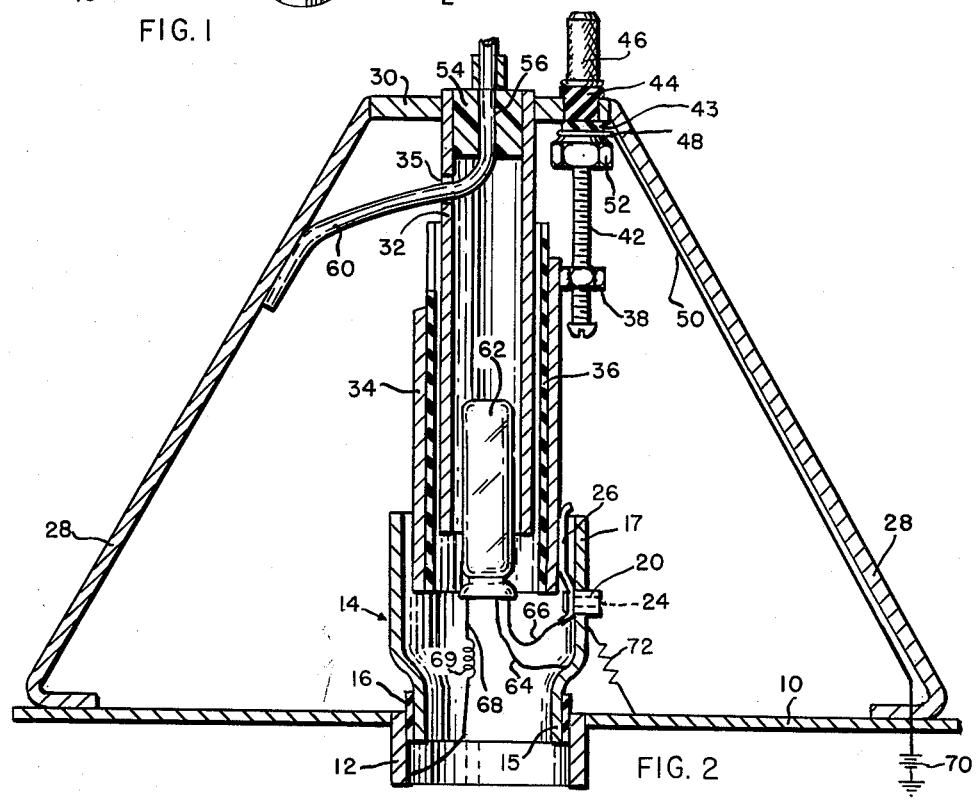
Fig. 2 is a cross-sectional view of the tank structure taken along the lines 2—2 of Fig. 1.

Referring now to Figs. 1 and 2 of the drawing, there is shown an annular disc 10 made of aluminum or other suitable light-weight material which forms the base of the tank circuit. Extending downwardly from the inner periphery of disc 10 and integrated therewith is a first tubular member 12. A second tubular member 14 having a relatively narrow cross-sectional area at one end 15 and a relatively wide cross-sectional area at the other end 17 is telescopically mounted within first tubular member 12 so that narrow end 15 is encompassed by a cylindrical sleeve 16 made of mica or other suitable insulating material which is cemented to the inner surface of first tubular member 12. Tubular member 14 is so mounted within first tubular member 12 that wide end 17 extends upwardly from disc 10 and is provided with an insulated bushing 20 extending through the cylindrical wall as shown. Bushing 20 is provided with an axial metallic insert 24 which is terminated at one end by spring contact member 26. If desired, first tubular member 12 may be eliminated by providing second tubular member 14 with a mounting flange, not shown, and insulating the mounting flange from disc 10 by any suitable means.

Figure 4:
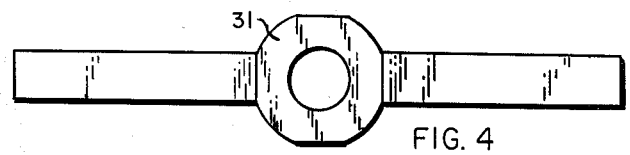
Fig. 4 illustrates a configuration of one of the metallic strips shown in Fig. 1.

Extending upwardly from the outer periphery of disc 10 and affixed thereto are four equally spaced flat metallic strips 28 which are terminated by annular ring 30 preferably arranged parallel to and concentric with disc 10 and having an outer diameter substantially smaller than that of disc 10. By this arrangement, the tank circuit assumes the convenient shape of a frustrated cone to better conform with a preferred conical element of an antenna utilized in radiosonde systems. If desired, the strips 28 may comprise two orthogonally positioned bipods, each having the configuration shown in Fig. 4. With such an arrangement, the superimposed central annular section 31 of the bipods will overlap to effectively form the annular ring 30. It is to be understood, of course, that the tank circuit arrangement is not to be limited to a conical shape but that other suitable shapes may be adopted. For example, if desired annular ring 30 may have substantially the same dimensions as disc 10 so that a cylindrically-shaped tank circuit may be provided. Of course, such a configuration would affect the resonant frequency characteristics of the tank circuit.

Extending downwardly from the inner periphery of annular ring 30 and affixed thereto is an inner tubular member 32 having its free end extending partially into wide end 17 of tubular member 14. As shown, all of the tubular members are axially aligned. An aperture 35, the purpose of which will hereinafter be explained, is provided in the wall of tubular member 32 adjacent the end thereof affixed to annular ring 30. Encompassing inner tubular member 32 for substantially the entire length thereof is a slideable tubular member 34 which is provided with an insulating sleeve 36, made of mica or other suitable insulating material, cemented to the inner surface of slideable member 34. Affixed to the upper end of slideable member 34 is a horizontally disposed annular tab 38 having a threaded aperture to threadably engage a vertically disposed adjustment screw 42 which extends through insulated bushing 44 provided therefor in annular ring 30, and is terminated by a knob or handle 46 made of suitable insulating material. Affixed to adjustment screw 42 and spaced from annular ring 30 by insulated washer 43 is a metallic eyelet 48 to which may be soldered a lead-in wire conductor 50. A nut 52 abuts eyelet 48 and is adapted to threadably engage adjustment screw 42. By this arrangement, axial displacement of tubular member 34 within second tubular member 14 may readily be achieved. Thus rotation of screw 42 in one direction will cause tubular member 34 and its attached insulation sleeve 36 to slide downwardly over inner tubular member 32 and into tubular member 14 while a rotation of screw 42 in the opposite direction will cause tubular member 34 and insulation sleeve 36 to slide upwardly over inner tubular member 32 and out of tubular member 14. As mentioned above, insulation sleeve 36 is cemented to slideable tubular member 34 so that both the sleeve 36 and tubular member 34 move simultaneously in the same direction. It is desirable that the lower end of tubular member 34 be encompassed by the wide end of second tubular member 14 at all times so that the capacitance between second tubular member 14 and sleeve 34 may be effectively varied by the axial movement of tubular member 34. Spring contact 26 is so constructed and arranged that it is in contact with the outer surface of slideable tubular member 34 at all positions thereof. As shown, the upper end of tubular member 34 may be obliquely cut as at 41 so that, when tubular member 34 is in it aperture 35 will remain unobstructed.

For connecting an antenna to the tank circuit, there is provided an insulated bushing 54 which is mounted within the upper end of inner tubular member 32. As shown, bushing 54 has a central bore 56 for supporting one end of a feed-in conductor 60 which extends through aperture 35 and is terminated at one of the flat, thin metallic strips 28. For shielding purposes, the tank circuit hereinabove described may be surrounded by conically-shaped surface 61.

A transmitter tube 62 may be centrally positioned within the lower end of inner tubular member 32 and supported in any suitable manner. The electrical connections of tube 62 to the tank circuit for operation as an oscillator are as follows: Grid terminal lead 64 of tube 62 is attached to the inner surface of second tubular member 14, plate terminal lead 66 is soldered or brazed to spring contact 26 by means of metallic insert 24; and cathode terminal lead 68 is connected to a choke coil 69 which is affixed to disc 10. A source of positive potential such as battery 70 is connected to wire conductor 50 which may extend along one of the metallic strips 28 through disc 10 to the positive terminal of battery 70. A resistor 72 may be connected between cup-shaped member 14 and disc 10 to provide a conventional grid-leak.

Figure 3:
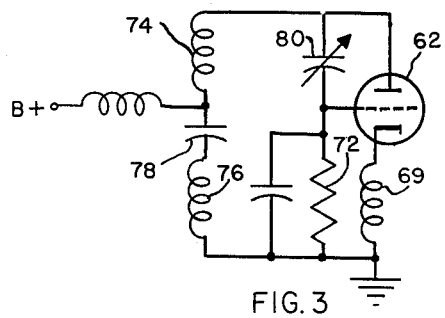
Fig. 3 illustrates in schematic form a possible equivalent electrical circuit of the tank system of Fig. 1.

The equivalent electrical circuit of the tank circuit described above is illustrated in Fig. 3. The inductances 74 and 76 of the tank circuit schematically shown in Fig. 3 correspond effectively to the flat metallic strips 28. The four strips 28 shown in Figs. 1 and 2 may be considered a series of parallel connected inductances which are connected in series with the capacitance existing between inner tubular member 32 and slideable tubular member 34. This capacitance is the equivalent of the capacitor 78 shown in Fig. 3. It is to be understood, of course, that the inductance of the tank circuit may be decreased by merely adding more flat metallic strips 28 circumferentially around disc 10. The resonant frequency of the tank circuit may be altered within narrow limits by varying the distance which slideable tubular member 34 is inserted within second tubular member 14 and this tuning capacitance is shown schematically in Fig. 3 at 80. The direct-current voltage is applied to the plate of tube 62 through lead 50, adjustment screw 42, tab 38, slideable tubular member 34 and spring contact 26. The direct-current voltage isolating capacitor is provided by tubular members 12 and 14 which, as hereinbefore described, are spaced from each other by insulated cylindrical sleeve 16.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A resonant tank structure for a radiosonde comprising a pair of spaced mutually opposing annular metallic discs, said discs being parallel and concentrically disposed relative to each other, a plurality of flat metallic strips interconnecting the outer peripheries of said annular discs, a first metallic tubular member having one end affixed to the inner periphery of one of said annular discs, a second metallic tubular member mounted along the inner periphery of the other of said annular discs whereby the free end of said second tubular member encompasses the free end of said first tubular member and is radially spaced therefrom, means for insulating said second tubular member from said other annular disc, a third tubular member encompassing said first tubular member for substantially the entire length thereof and radially spaced therefrom, an insulated sleeve affixed to the inner surface of said third tubular member, means operatively associated with said third tubular member for axially positioning said third tubular member within said second tubular member, a spring contact member having one end affixed to said second tubular member, the free end of said contact member being in sliding contact with the outer surface of said third tubular member, a bushing of insulating material mounted within the affixed end of said first tubular member and encompassed thereby, a central bore in said bushing, an aperture in the wall of said first tubular member adjacent said affixed end, and a feed-in conductor having one end attached to one of said flat metallic strips, the other end of said feed-in conductor extending through said aperture and said bore.

2. In combination, a resonant tank structure comprising upper and lower spaced annular discs, said discs being parallel and concentrically disposed relative to each other, a plurality of flat metallic strips interconnecting the outer peripheries of said annular discs, a first metallic tubular member extending downwardly from the inner periphery of said upper annular disc and having one end thereof affixed to said inner periphery, a vacuum tube mounted within the free end of said first tubular member and having at least a plate, a grid, and a cathode, a second metallic tubular member radially spaced from and encompassing said first tubular member for substantially the entire length thereof and adapted to slideably move over said first tubular member, an insulated sleeve affixed to the inner surface of said second tubular member for substantially the entire length thereof, a third metallic tubular member extending downwardly from said lower annular disc and affixed to the inner periphery thereof, a fourth metallic tubular member telescopically mounted within said third tubular member and adapted to encompass one end of said second tubular member, an insulated sleeve intermediate said third and fourth tubular members, means operatively associated with said second tubular member for axially positioning said second tubular member within said fourth tubular member, a spring contact member having one end affixed to the wall of said fourth tubular member and the other end in sliding contact with the outer surface of said second tubular member, said plate being connected to said spring contact member, said grid being connected to said fourth tubular member, said cathode being connected to said lower annular disc, a feed-in conductor having one end affixed to one of said flat strips, the other end of said feed-in conductor extending through the wall of said first member, and means for supporting said feed-in conductor within said first tubular member.

3. The combination in accordance with claim 2 wherein all of said tubular members are axially aligned.

References Cited in the file of this patent

UNITED STATES PATENTS

| | | |
|---|---|---|
| 2,248,227 | Gantet | July 8, 1941 |
| 2,415,749 | Malter | Feb. 11, 1947 |
| 2,417,542 | Carter | Mar. 18, 1947 |
| 2,443,908 | Gurewitsch | June 22, 1948 |
| 2,547,637 | Gardiner et al. | Apr. 3, 1951 |
| 2,579,315 | Gurewitsch | Dec. 18, 1951 |
| 2,627,578 | Klein | Feb. 3, 1953 |